(12) United States Patent
Venkatesan et al.

(10) Patent No.: US 10,839,366 B2
(45) Date of Patent: Nov. 17, 2020

(54) DYNAMIC OFFERS ON ACCOUNTS

(71) Applicants: Daya Venkatesan, Singapore (SG); Nandhinidevi Ragupathiraj, Singapore (SG); Mohanraj Ragupathiraj, Singapore (SG)

(72) Inventors: Daya Venkatesan, Singapore (SG); Nandhinidevi Ragupathiraj, Singapore (SG); Mohanraj Ragupathiraj, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 97 days.

(21) Appl. No.: 16/142,797

(22) Filed: Sep. 26, 2018

(65) Prior Publication Data

US 2020/0097941 A1 Mar. 26, 2020

(51) Int. Cl.
G06Q 30/00 (2012.01)
G06Q 20/22 (2012.01)
G06Q 20/36 (2012.01)
G06Q 30/02 (2012.01)

(52) U.S. Cl.
CPC ......... G06Q 20/227 (2013.01); G06Q 20/363 (2013.01); G06Q 30/0215 (2013.01)

(58) Field of Classification Search
None
See application file for complete search history.

(56) References Cited

U.S. PATENT DOCUMENTS

| | | | | |
|---|---|---|---|---|
| 10,104,231 B2* | 10/2018 | Blodgett | ............. | H04M 3/5133 |
| 10,354,268 B2* | 7/2019 | Celikyilmaz | ...... | G06Q 30/0222 |
| 2003/0126080 A1* | 7/2003 | Ogmen | ...................... | G07F 7/08 |
| | | | | 705/40 |
| 2004/0093259 A1* | 5/2004 | Pych | ...................... | G06Q 30/02 |
| | | | | 705/14.49 |
| 2005/0154717 A1* | 7/2005 | Watson | ................. | G06F 16/951 |
| 2005/0172001 A1* | 8/2005 | Zaner | ...................... | H04L 51/38 |
| | | | | 709/205 |
| 2005/0182773 A1* | 8/2005 | Feinsmith | ............... | G06Q 10/10 |
| 2005/0246278 A1* | 11/2005 | Gerber | ................... | G06Q 20/02 |
| | | | | 705/44 |
| 2007/0276801 A1* | 11/2007 | Lawrence | ........... | G06F 16/9535 |
| 2008/0059307 A1* | 3/2008 | Fordyce, III | ........... | G06Q 30/00 |
| | | | | 705/14.27 |
| 2008/0059317 A1* | 3/2008 | Chandran | .............. | G06Q 20/20 |
| | | | | 705/16 |
| 2008/0147793 A1* | 6/2008 | Singh | ................... | G06Q 10/109 |
| | | | | 709/204 |

(Continued)

OTHER PUBLICATIONS

STIC EIC 3600 Search Report for application 16142797 dated Mar. 31, 2020. (Year: 2020).*

*Primary Examiner* — Matthew T Sittner
(74) *Attorney, Agent, or Firm* — Loeb & Loeb LLP (57) ABSTRACT

The payment information may include the offers that are available on each of the plurality of payment accounts that are available to a user. In some embodiments, the payment accounts may be from separate issuers. The offers may be communicated to a user or a use may set preferences for a ranking scheme to be used and the best offer may be automatically applied by selecting to use the payment device related to the best offer.

20 Claims, 8 Drawing Sheets

(56) References Cited

U.S. PATENT DOCUMENTS

| | | | | |
|---|---|---|---|---|
| 2008/0234041 A1* | 9/2008 | Berman | G07F 17/3244 | 463/27 |
| 2009/0198612 A1* | 8/2009 | Meimes | G06Q 10/087 | 705/39 |
| 2010/0048358 A1* | 2/2010 | Tchao | G06F 19/3481 | 482/9 |
| 2010/0297983 A1* | 11/2010 | Aarni | H04W 8/183 | 455/411 |
| 2010/0312635 A1* | 12/2010 | Cervenka | G06Q 30/02 | 705/14.38 |
| 2011/0022424 A1* | 1/2011 | VonDerheide | G01C 21/20 | 705/5 |
| 2011/0098928 A1* | 4/2011 | Hoffman | A63B 71/0622 | 702/5 |
| 2011/0145050 A1* | 6/2011 | Gross | G06Q 10/10 | 705/14.25 |
| 2011/0173246 A1* | 7/2011 | Eschenauer | H04L 67/02 | 709/201 |
| 2012/0015624 A1* | 1/2012 | Scott | G06F 9/451 | 455/405 |
| 2012/0215610 A1* | 8/2012 | Amaro | G06Q 30/02 | 705/14.23 |
| 2012/0265676 A1* | 10/2012 | Gould | G06Q 30/06 | 705/39 |
| 2012/0271691 A1* | 10/2012 | Hammad | G06Q 10/10 | 705/14.17 |
| 2012/0290977 A1* | 11/2012 | Devecka | G06Q 10/10 | 715/810 |
| 2013/0085869 A1* | 4/2013 | Carlson | G06Q 30/0226 | 705/14.72 |
| 2013/0110604 A1* | 5/2013 | Rooke | G06Q 20/20 | 705/14.23 |
| 2013/0124263 A1* | 5/2013 | Amaro | G06Q 30/02 | 705/7.34 |
| 2013/0157693 A1* | 6/2013 | Mercuri | H04W 4/029 | 455/456.3 |
| 2013/0185147 A1* | 7/2013 | Letca | G06Q 30/0241 | 705/14.47 |
| 2013/0246273 A1* | 9/2013 | Ovick | G06Q 20/045 | 705/44 |
| 2013/0260893 A1* | 10/2013 | Shin | G06F 3/04815 | 463/42 |
| 2013/0339145 A1* | 12/2013 | Blum | G06Q 30/0255 | 705/14.53 |
| 2014/0067503 A1* | 3/2014 | Ebarle Grecsek | G06Q 30/0222 | 705/14.23 |
| 2014/0129314 A1* | 5/2014 | Kim | G06Q 30/0233 | 705/14.33 |
| 2014/0172660 A1* | 6/2014 | Louie | G06Q 40/02 | 705/35 |
| 2014/0173459 A1* | 6/2014 | Gaiser | H04L 67/22 | 715/753 |
| 2015/0287077 A1* | 10/2015 | Celikyilmaz | G06Q 30/0253 | 705/14.51 |
| 2015/0332302 A1* | 11/2015 | Celikyilmaz | G06Q 30/0222 | 705/14.23 |
| 2016/0248712 A1* | 8/2016 | Snider | H04L 51/18 | |
| 2016/0328736 A1* | 11/2016 | Wang | G06Q 30/0239 | |
| 2017/0060951 A1* | 3/2017 | Masala | G06Q 50/01 | |
| 2019/0065960 A1* | 2/2019 | Taylor | G06N 20/00 | |

\* cited by examiner

DYNAMIC OFFERS ON ACCOUNTS

BACKGROUND

Consumers often have offers available them that they do not know about. When making a purchase, the focus is often on the purchase and not on whether any deals or offers may be available. The situation becomes further complex when a user has several payment accounts available and each payment account may have different offers available. Finally, the payment accounts may be from different issuers which may further complicate the ability of a user to efficiently determine which offers are available on a specific purchase.

SUMMARY

The described system and method may collect account information from a variety of payment accounts. The payment information may include the offers that are available on each of the plurality of payment accounts that are available to a user. In some embodiments, the payment accounts may be from separate issuers. The offers may be communicated to a user or a use may set preferences for a ranking scheme to be used and the best offer may be automatically applied by selecting to use the payment device related to the best offer.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

Specification

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The payment selection system and methods described herein may provide a user of multiple payments accounts an efficient way to maximize the rewards or offers received through one or more payment account programs for a given purchase or other transaction. For example, a user may have various payment accounts. In some embodiments, the payment accounts may correspond to a points or rewards program. Each rewards account program may accumulate offers for each purchase made using the program's respective payment account.

The transaction may be any type of non-cash transaction, such as credit card, debit card, card-on-file (COF), e-commerce, tokenized, etc. Often, however, at the time of a particular purchase or other transaction, a user may be unaware of the loyalty or other offers or offers they have in any particular account, or what type of rewards may be earned with a given transaction. Traditionally, this would mean a user may use a card or other payment account at random without knowing the loyalty points that could be earned or offers to be accepted by using a different account. In some embodiments, the payment selection system may allow a user to take advantage of the rewards from their rewards programs or receive the benefits of an offer even if they may not be aware of those points or initiate a transaction with the specific card or account linked to those offers or offers.

Figure 1:
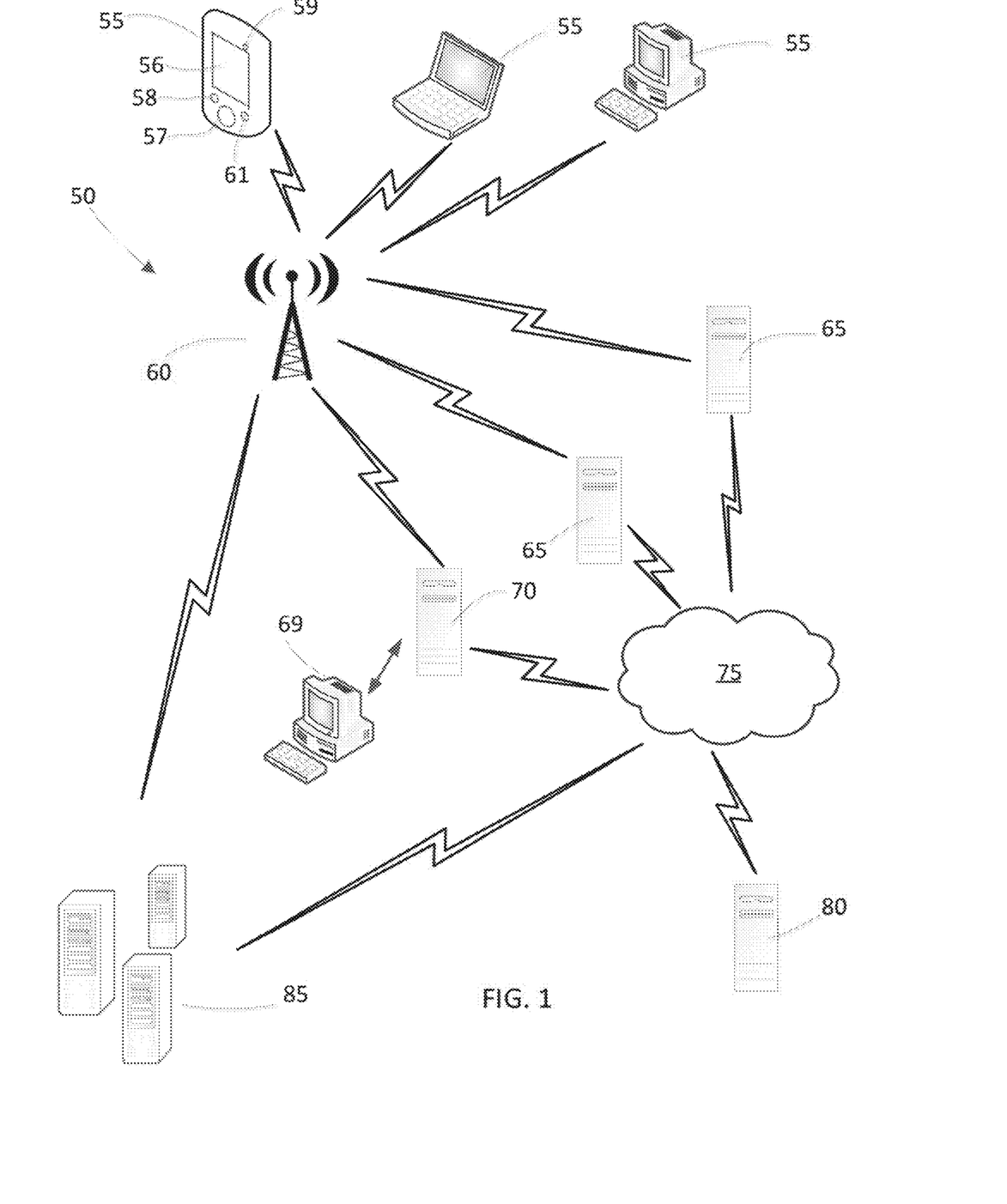
FIG. 1 is an illustration of the elements of an embodiment of a system that includes a system for monitoring and preventing fraud as disclosed herein.

A high level illustration of some of the elements in a sample computing system 50 that may be physically configured to implement the payment selection system and process is illustrated in FIG. 1. The system 50 may include any number of computing devices 55, such as smart phones or tablet computers, mobile computing devices, wearable mobile devices, desktop computers, laptop computers, or any other computing devices that allow users to interface with a digital communications network, such as digital communication network 60. Connection to the digital communication network 60 may be wired or wireless, and may be via the internet or via a cellular network or any other suitable connection service. Various other computer servers may also be connected to via the digital communication network 60, such as a merchant server 70, a payment server 85, one or more issuer servers 65 and a token server 80. The merchant server 70 may also be connected, either directly or over the digital communication network 60, to one or more point-of-sale (POS) devices 101, such as in a merchant store. The payment server 85 may represent, for example, a credit card issuer, a bank, or another financial institution. Various of these servers or computer entities may also be connected through a secure payment network 75. The payment network 75 may be an electronic payment system used to accept, transmit, or process transactions made by users with payment accounts for money, goods, or services, and to transfer information and funds among payment account issuers, merchants, payment account holders, payment processors, acquirers, etc. In the illustrated embodiment, at least the merchant server 70, the token server 80, and the payment server 85, and the one or more issuer servers 65 may be connected via the payment network 75, but it is contemplated that other entities, such as the an acquirer, may be connected as well. It is also contemplated that the payment server 85 may also be connected to the one or more user devices 55 over the digital communication network 60.

In one embodiment, the computing device 55 may be a device that operates using a portable power source, such as a battery. The computing device 55 may also have a display 56 which may or may not be a touch sensitive display. More specifically, the display 56 may have a capacitance sensor, for example, that may be used to provide input data to the computing device 55. In other embodiments, an input pad 57 such as arrows, scroll wheels, keyboards, etc., may be used to provide inputs to the computing device 55. In addition, the computing device 55 may have a microphone 58 which may accept and store verbal and sound data, a camera 59 to accept images and a speaker 61 to communicate sounds.

Figure 2:
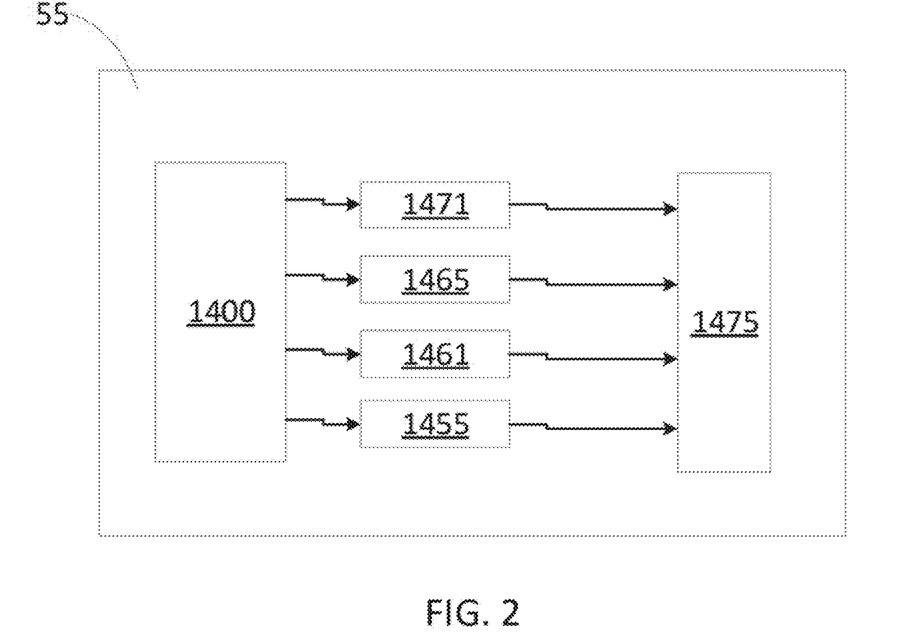
FIG. 2 is a schematic illustration of elements of an embodiment of an example computing device.
Figure 3:
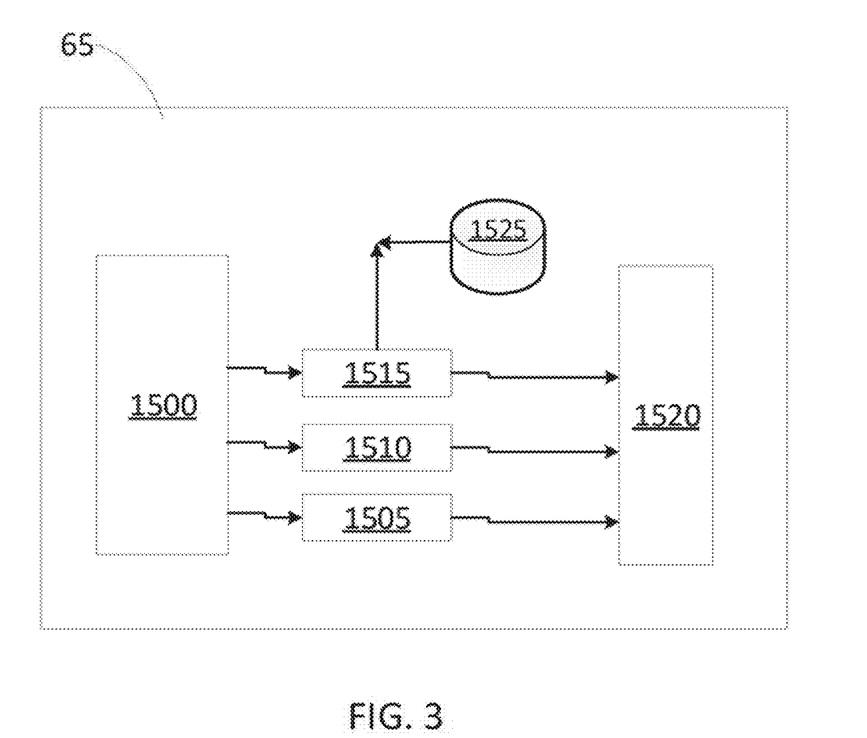
FIG. 3 is a schematic illustration of elements of an embodiment of a server type computing device.

FIG. 2 is a simplified illustration of the physical elements that make up an embodiment of a computing device 55 and FIG. 3 is a simplified illustration of the physical elements that make up an embodiment of a server type computing device, such as the payment server 85, but the merchant server 70, the issuer servers 65, and the token server 80 may reflect similar physical elements in some embodiments. Referring to FIG. 2, a sample computing device 55 is illustrated that is physically configured according to be part of the computing system 50 shown in FIG. 1. The portable computing device 55 may have a processor 1400 that is physically configured according to computer executable instructions. In some embodiments, the processor can be specially designed or configured to optimize communication between the server 85 and the computing device 55 relating to the payment selection service described herein. The computing device 55 may have a portable power supply 1455 such as a battery, which may be rechargeable. It may also have a sound and video module 1461 which assists in displaying video and sound and may turn off when not in use to conserve power and battery life. The computing device 55 may also have volatile memory 1465 and non-volatile memory 1471. The computing device 55 may have GPS capabilities that may be a separate circuit or may be part of the processor 1400. There also may be an input/output bus 1475 that shuttles data to and from the various user input/output devices such as a microphone, a camera 59, a display 56, or other input/output devices. The portable computing device 55 also may control communicating with the networks, such as communication network 60 in FIG. 1, either through wireless or wired devices. Of course, this is just one embodiment of the portable computing device 55 and the number and types of portable computing devices 55 is limited only by the imagination.

The physical elements that make up an embodiment of a server, such as the payment server 85, are further illustrated in FIG. 3. In some embodiments, the payment server is specially configured to run the payment selection service as described herein. At a high level, the payment server 85 may include a digital storage such as a magnetic disk, an optical disk, flash storage, non-volatile storage, etc. Structured data may be stored in the digital storage such as in a database. More specifically, the server 85 may have a processor 1500 that is physically configured according to computer executable instructions. In some embodiments, the processor 1500 can be specially designed or configured to optimize communication between a portable computing device, such as computing device 55, and the server 85 relating to the payment selection service as described herein. The server 85 may also have a sound and video module 1505 which assists in displaying video and sound and may turn off when not in use to conserve power and battery life. The server 85 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as communication network 60 and payment network 75, either through wireless or wired devices. In some embodiments, a payment selection controller for running the payment selection service may be located on the computing device 55. However, in other embodiments, the payment selection controller may be located on payment server 85, or both the computing device 55 and the server 85. Of course, this is just one embodiment of the payment server 85 and additional types of servers are contemplated herein.

In the embodiment illustrated in FIG. 1, the payment server 85 may be connected to the merchant server 70 either through the digital communication network 60, through the payment network 75 or through other connections. In some embodiments, the merchant server 70 may be associated with any type of merchant offering goods or services for purchase with payment accounts, whether those purchases are online or otherwise. For online purchases, the merchant server 70 or a group of servers may host a merchant website where the merchant's goods or services may be purchases by a user. In some embodiments, the payment selection system may collect payment information from the user, such as payment account credentials, that may be used for the immediate transactions as well as for future purchases with the same or other merchants as further described herein. As such, the payment selection system may consolidate the entities to which a user shares its confidential payment information. Specifically, the user may share its payment account information with the payment selection system via software or other interface hosted by the system, and payment selection system store the payment and other account information for use in future purchases. In some embodiments, the payment selection system may also store information regarding offers or loyalty programs associated with the stored payment accounts. The payment selection system may also be in contact with other payment account issuers to receive up-to-date information regarding the details of associated offers or loyalty programs.

In some embodiments, the payment selection system may be hosted on or otherwise run by the payment server 85. In some embodiments, the payment selection system may be hosted by another entity, such as an issuer using an issuer server 65 or a merchant using a merchant server 70. In some embodiments, a user may access the payment server 85 via a computing device 55 such as a smartphone, and may set up an account with the payment selection system. The user may provide payment account or banking information for one or more payment accounts provided by one or more account issuers or associated with one or more merchants. One or more of the payment accounts may be associated with an account program, such as a rewards program or loyalty program. The payment selection system may store such payment account information associated with the user's account that can be retrieved at the user's request to complete e-commerce transactions. Purchases using payment information stored with the payment selection system, however, may occur in any of a variety of ways. In some embodiments, the user may select a payment account or card stored through the payment selection system for use performing a given transaction. As described in more detail below, the payment selection system may determine which of a user's payment accounts to use for a given transaction based on the offers available.

The computing device 55 may be able to communicate with a computer server or a plurality servers, such as the payment server 85, the merchant server 70, and issuer servers 65. The computing device 55 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the server or may be through a digital communication network 60 such as cellular service, through the Internet, through a private network, through Bluetooth, etc.

In some embodiments, the payment servers 85 may be associated with the payment selection system, and may send and receive information to and from a user device 55 associated with the user payment accounts of a user. Specifically, software may be included on the user computing device 55 allowing notifications to be received from the payment selection system via the digital communications network 60. In some embodiments, the software may be an application through which a user may complete transactions, such as banking, money transfer, merchant purchases, etc. In some embodiments, the software may be an add-on to a web browser included on the user computing device 55. In some embodiments, the payment selection system's software may be an application installed on the user computing device 55 that allows for the use of other applications on the user computing device, such as applications provided by a bank, online merchant, email service, payment provider, etc. In yet other embodiments, the payment selection service provide notifications using software native to the user computing device 55, such as SMS messaging or other notifications. In such embodiments, the payment selection system may send notifications to the user device 55 regarding payment selection determinations, such as are described in further detail below.

Figure 4:
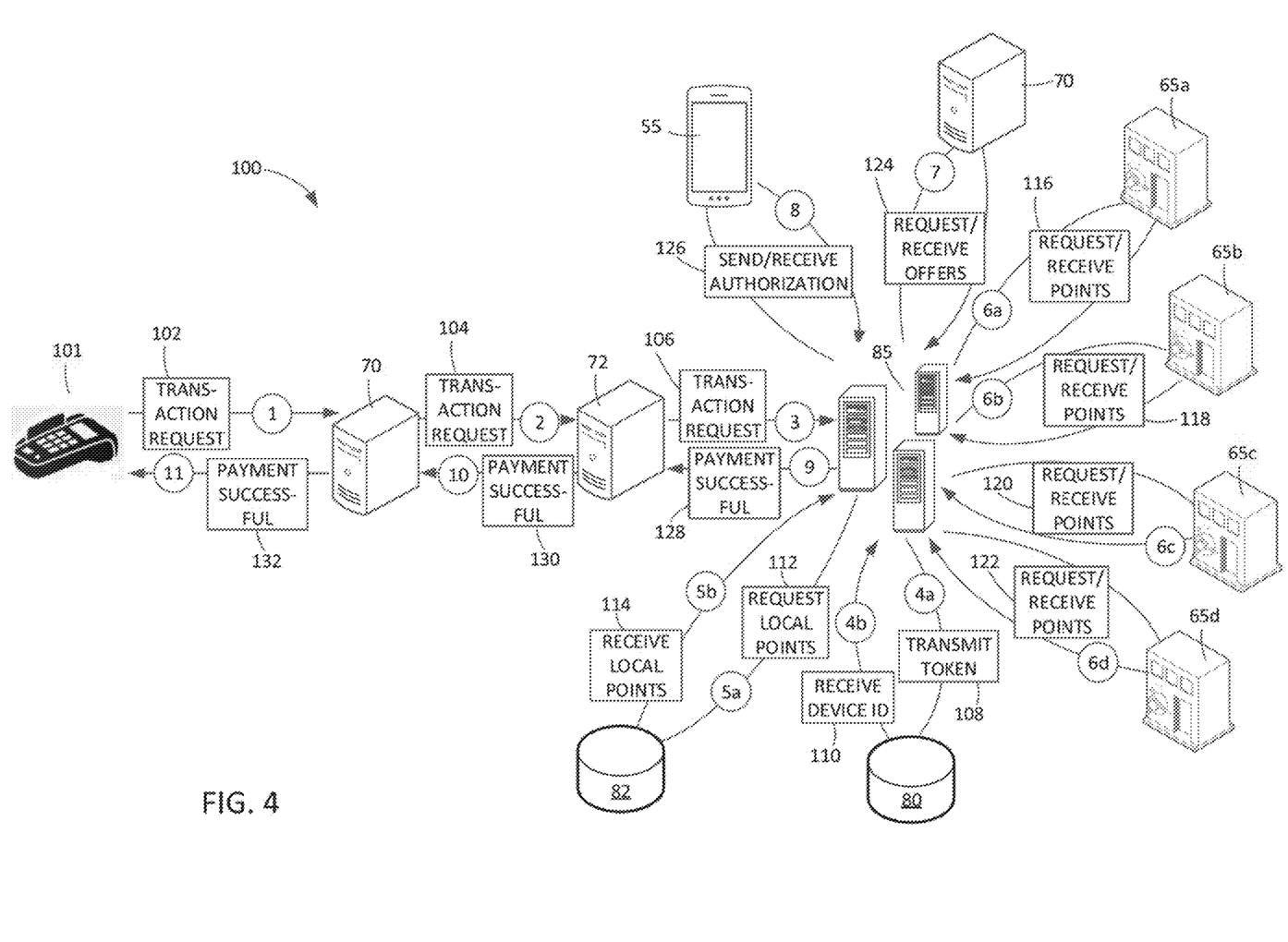
FIG. 4 is a block diagram illustrating system elements for an embodiment of a payment selection system in accordance with the current disclosure.

FIG. 4 is a data flow diagram generally illustrating an embodiment 100 of a payment selection system 100 that may determine which of a plurality of user payment accounts to use for a transaction. In some embodiments, a user may initiate a transaction in any of a variety of ways, e.g., swiping or inserting a credit card at a merchant POS, tapping an electronic payment device against a POS terminal 101, selecting a payment account during an online e-commerce transaction, etc. In the case of an e-commerce transaction, the POS terminal 101 may be a user's personal computing device, such as a smart phone or computer. At 102, the POS terminal or other computing device may add processing options data object lists (PDOL) data to the transaction along with the media access control (MAC) address and token details gleaned from the payment device and transmit this data as a transaction request to the merchant server 70 or computer. At 104, the merchant server 70 may forward this transaction request and accompanying data on to an acquirer server 72 of an acquirer of the merchant. At 106, the acquirer server 72 may transfer the transaction request data to the payment server or servers 85 hosting the payment selection system. The payment selection system may then identify the token or other identifying information transmitted in the transaction request. For example, in embodiments in which a token is transmitted with the transaction request, at 108, the payment selection system may transmit the token to a token server 80. In some embodiments, the token server 80 may include a database of user tokens corresponding to device identifiers for those users, such as for the user device identifier and unique user identifier enrolled during the enrollment process with the payment selection system. The token server 80 may also include a list of payment accounts or other tokens for payment accounts or credit cards enrolled by the user with the payment selection system. At 110, the payment server 85 may receive the requested device identifier and payment account information from the token server 80.

In some embodiments, the entity associated with the payment selection system may also be associated with payment accounts or credit cards with which users may have accounts. These accounts may, in turn, include account programs that involve rewards, offers, rebates, discounts and/or loyalty points. In such embodiments, at 112, the payment selection system may instruct the payment server 85 to request a local offer provider 82 to determine loyalty or offers available to the user for the particular transaction. At 114, the payment server 85 may receive information reflecting the offers available for the transaction in the transaction request in the local account program. In some embodiments, the payment selection system may need to contact issuer servers 65a-65d for some or each of the payment accounts for which the user has enrolled. For example, in the embodiment illustrated in FIG. 4, the user in question may have enrolled with four payment accounts through four issuers with issue servers 65a-d. In such embodiments, the payment selection system may, at 116, 118, 120, and 122, to instruct the payment server 85 to request the cards or accounts the user has at each respective issuer based on the token server data. The payment server 85 may then receive offer data for each respective account program at each respective issuer from the issue servers 65a-d. It should be understood that, although four additional issuers are shown in FIG. 4, any number of issuers or user payment accounts are contemplated.

At 124, the payment selection system may instruct the payment server 85 to transmit a request for offer data to the merchant server 70. In some embodiments, the merchant involved in the specific transaction may have offers or rewards corresponding to a loyalty program or some other account program. In some embodiments, the merchant involved in the requested transaction may have offers or other benefits in place related to transaction completed with specific issuers of payment accounts. Upon receiving offer data and other offer information from the merchant server 70, the payment selection system may determine the best user payment account to use for the requested transaction based on the points data received from the issuer servers 65*a-d* and the merchant server 70.

It should be understood that the best user payment to use for any given transaction may be based on a variety of criteria that may be customizable by a user. For example, in some embodiments, a user may identify preferences, upon enrollment or otherwise, regarding preferences for which user payment accounts to use based on the points available for particular transactions. For example, a user may provide a preference for a certain payment account unless the offers exceed a certain pre-determined threshold amount. In other embodiments, the user may indicate a pre-determined payment account to use for transactions above or below a certain amount, or for certain types of transactions (e.g., restaurants, sports equipment, gasoline, etc.).

Figure 5:
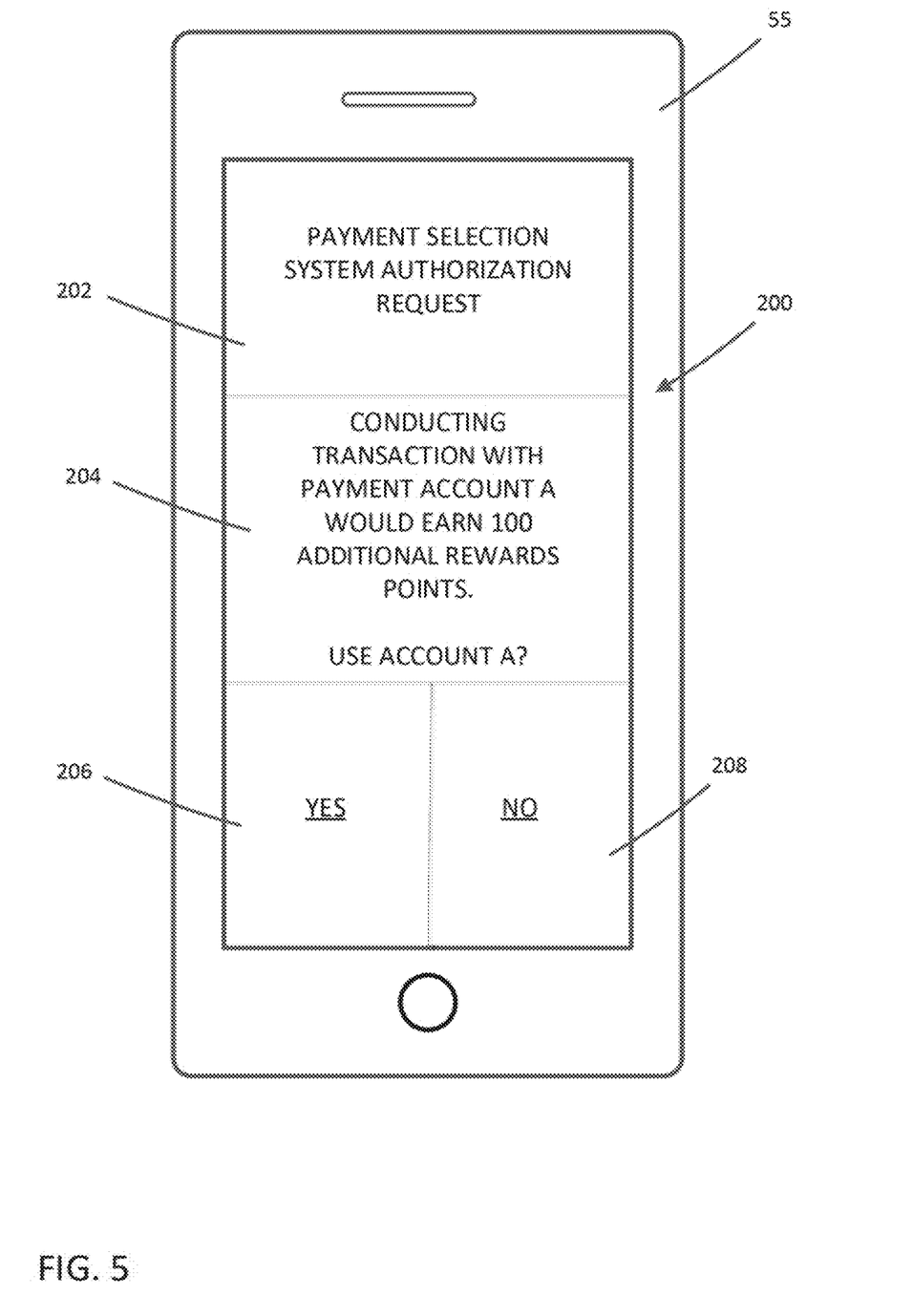
FIG. 5 is a user interface diagram illustrating example features of an embodiment of a user interface for the payment selection system as described herein.

At 126, in some embodiments, the payment selection system may instruct the payment server 85 to transmit an authorization request to a user computing device 55 associated with the user's enrollment. The authorization request may result in a notification being displayed on the user computing device. An example of a graphical user interface (GUI) 200 with such an identification on an example user computing device 55 is shown in FIG. 5. The GUI may include an alert banner 202, a rewards banner 204, and response buttons 206, 208. The alert banner 202 may include information directed to the user to indicate, for example, the source of the request. The rewards banner 204 may include information regarding the amount of offers that may be earned by authorizing the best payment account determined by the payment selection system, and may include the amount of additional offers that may be earned. In some embodiments, the offers awarded through a first payment account program and a second payment account program may not be directly comparable. In such embodiments, the user may include pre-determined weighting to give points from each program account. In some embodiments, the GUI 200 may additionally include details of the offers that may be earned based on the payment account chosen by the user to initiate the transaction as well as the offers for the best payment account program determined by the system. The GUI may include a YES button 206 to indicate that the user would like to select the new account the system has determined best, and a NO button 208 to decline using the account the system has determined as best. In some embodiments, if the user indicates the NO button 208, the payment selection system may revert to using the payment account used by the user to initiate the transaction. It should be understood by those skilled in the art that the GUI shown in FIG. 5 is exemplary only, and that other GUI configurations may be used.

Referring again to FIG. 4, once a user has made a selection to use the user payment account suggested by the payment selection system or to decline and use the originally initiated user payment account, the payment server 85 may receive the selection from the user computing device 55. In some embodiments, the payment selection system may include a predetermined authorization time limit for which the system will wait to receive a selection from the user computing device 55 before moving forward with a transaction. For example, in some embodiments, the payment selection system may wait one minute for a response from the user computing device 55. In other embodiments, the payment selection system may wait thirty seconds, or two minutes, or three minutes in other embodiments. Those skilled in the art will understand that any suitable authorization time limits may be used.

In some embodiments of the system, the user may select that, upon expiration of the authorization time limit, the system will proceed with the transaction using the best payment account suggested by the payment selection system. In other embodiments, the user may select that the system proceed with the payment account originally chosen by the user in initiating the transaction. In yet other embodiments, the payment selection system may proceed with the requested transaction using the best payment account determined based on offers automatically without requesting or receiving authorization from the user at all.

In some embodiments, upon receiving the authorization from the user computing device 55, the payment selection system may request and receive authorization to charge from the issuer of the chosen payment account to proceed with the transaction. For example, the payment selection system may request and receive an OAuth for the requested transaction using the best payment account as determined by the system. At 128, the payment selection system may instruct the payment server 85 to transmit a payment successful notification to the acquirer server 72. At 130, the acquirer server 72 may then transmit a payment successful notification to the merchant server 70, which may, at 132, transmit a payment successful notification to the POS 101, or to the user computing device used to initiate the transaction.

Figure 6:
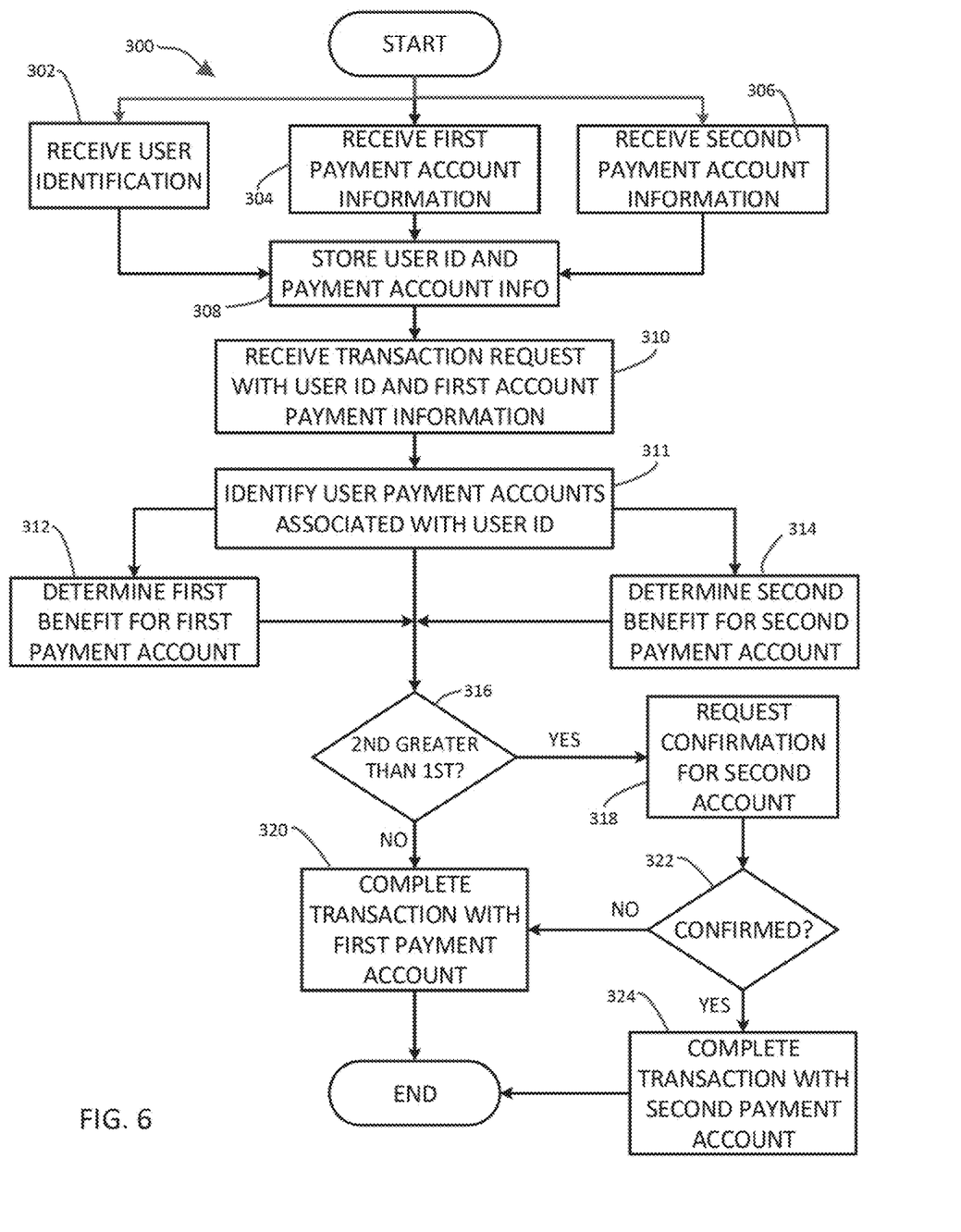
FIG. 6 is a flow chart of an embodiment of a process for selecting payments using the payment selection system described herein.

FIG. 6 is a flowchart 300 of an embodiment of a method of using the payment selection system as shown and described herein. At 302, the system may receive user identifying information associated with a user from a user computing device, for example, via digital communication network 60. In some embodiments, the payment selection system may also receive one or more user device identifiers, such as a telephone number, IP address, etc., that may allow the payment selection system to identify a unique user computing device 55. The payment selection system may receive payment account information for a plurality of user accounts, including a first of the plurality of user accounts at 304 and a second of the plurality of user accounts at 306. In some embodiments, the first of the plurality of user accounts may be associated with a first account program, and the second of the plurality of user accounts may be associated with a second account program. Although only two user payment accounts associate with two account programs are included in FIG. 6, it should be understood that any number of payment accounts may be used, with any number of account programs. In some embodiments, the account programs may be loyalty or offers programs in which a user may earn points, for example, by completing transactions using the payment account associated with the account program.

In some embodiments, the payment selection system may, at 308, store the user identifying information and payment account information associated with the plurality of user payment accounts. In some embodiments, this information may be stored on the payment server 85. In some embodiments, the information may be stored in a token server 80, and accessible by the payment server 85 when presented with a token associated with the user identifying information. In such embodiments, the user computing device 55 may store a token upon enrollment with the payment selection system, and/or the user identifying information may be associated with a token in the payment selection system. Accordingly, in some embodiments, when the payment selection system receives user identifying information, the information may be associated with a token, which may be used to extract user payment account information, device identifiers, or other user information from the token server 80.

At 310, the payment selection system may receive a transaction request that may include user identifying information and payment information for the first user payment account of the plurality of user payment accounts. In some embodiments, as described in reference to FIG. 4, the transaction request may originate from a variety of sources, such as a POS device at a merchant, a user computing device, an e-commerce platform, etc. In some embodiments, the transaction request may be transmitted through a merchant server 70 and an acquirer server 72, and on to a payment server 85. In some embodiments, the transaction request may include user identifying information and payment account information for the first of the plurality of user payment accounts. In some embodiments, the user identifying information may be token reference ID for a tokenized PAN, an actual PAN, a username, a user device identifier, or any other suitable identification data. At 311, the payment selection system may identify the plurality of user payment accounts associated with the user identifying information in the transaction request. In some embodiments, the payment server 85 may query an internal database, or may query the token server 80 in other embodiments to retrieve a list of payment accounts associated with the user identifying information. In some embodiments, the first user payment account and the second user payment account may be identified by the payment selection system, although additional accounts may be identified as well. The payment selection system may determine whether each of the first and second user payment accounts are associated with account programs, such as rewards or loyalty points programs. In some embodiments, the first user payment account may be associated with a first account program and the second user payment account may be associated with a second account program.

At 312, the payment selection system may determine a first potential benefit for completing the requested transaction with the first payment account, and at 314, the payment selection system may determine a second potential benefit for completing the requested transaction with the second payment account. In some embodiments, the first and second potential benefits may be the offers awarded to the user for using the first or second payment accounts, respectively, to complete the requested transaction. It is contemplated, however, that offers for an account program may come in many forms, such as miles, points, currency, product or sales offers, discounts, rebates, etc. As shown and described with reference to FIG. 4, the payment selection system may determine the potential benefits for each of the account programs in a variety of ways. For example, in some embodiments, the payment selection system may query a local loyalty provider 82 for local offers, or may query other payment account or credit card issuers 65a-d to determine the potential benefits associated with other account programs of corresponding with user payment accounts.

Once all of the potential benefits for each of the account programs associated with each of the identified plurality of user payment accounts have been determined, the payment selection system may compare at least the first potential benefit with the second potential benefit to determine which of the account programs would result in a better benefit to the user if the associated user payment account were to be used to complete the requested transaction. In some embodiments, comparing the plurality of potential benefits may include comparing the offers that would be awarded based on the requested transaction by each respective account program. In some embodiments, the offers may be have cash equivalents that may be compared. In some embodiments, one or more of the account programs may include offers for discounts or other valuable products or services. In such embodiments, the cash value of offers may be compared to the cash value of the offer or discounts in order to determine which account program would provide the greatest benefit to the user for the particular requested transaction. In some embodiments, the merchant involved in the requested transaction may also have provide potential benefits related to the specific transaction or for the issuers corresponding to each respective user payment account. For example, a particular merchant may be offering a discount for certain products purchased with the first user payment account, but not with the second user payment account. In such embodiments, the payment selection system may consider the merchant benefits when determining the first and second potential benefits.

At 316, the payment selection system may compare the first potential benefit to the second potential benefit to determine which of the benefits is greater. In the embodiment shown in FIG. 6, the requested transaction was initiated by the user with the first user payment account. Accordingly, if, at 316, the payment selection system determines that the second potential benefit is not greater than the first potential benefit, the payment selection system may, at 320, complete the requested transaction using the first user payment account. However, if the payment selection system determines, at 316, that the second potential benefit is greater than the first potential benefit, the payment selection system may, at 318, may transmit a request confirmation to complete the requested transaction using the second user payment account instead of the first user payment account.

In some embodiments, requesting confirmation may include transmitting, via the digital communication network 60, a confirmation request to the user computing device 55 corresponding to the unique device identifier stored by the payment selection system. In such embodiments, the user may be alerted to the confirmation request and presented with the option to confirm the requested transaction with the second user payment account, or to decline the confirmation. In some embodiments, the confirmation request may display a GUI on the user computing device with selectable options, such as shown in FIG. 5. In some embodiments, if the user declines to confirm the confirmation of using the second user payment account, the payment selection system may, at 320, complete the transaction using the first user payment account. If, however, the user confirms the confirmation request, the payment selection system, at 324, may complete the requested transaction with the second payment account instead of the first payment account. Accordingly, the user may be awarded with the greater rewards benefits associated with the second user payment account as opposed to the first user payment account.

In some embodiments, the payment selection system may complete at least the steps outlined in blocks 310-324 of FIG. 6 in approximately real time with reference to the requested transaction. For example, once a transaction request is transmitted, the user computing device may receive a confirmation request very shortly afterwards, such as within a few seconds or minutes. In some embodiments, it is contemplated that the process described in FIG. 6 and other embodiments may take longer to develop, but may still have the same general outcome.

In some embodiments, the payment selection system may automatically select to complete the requested transaction with the payment account associated with the greatest potential benefit without transmitting a confirmation request to the user computing device. In some embodiments, the payment selection system may automatically confirm a switch to a user payment account associated with a greater benefit if the payment selection system does not receive confirmation or denial of the confirmation request within a predetermined length of time, such as thirty seconds, one minute, two minutes, five minutes, ten minutes, or thirty minutes. Likewise, in some embodiments, the payment selection system may automatically reject a switch to a user payment account associated with a greater benefit if the payment selection system does not receive confirmation of the confirmation request within a predetermined length of time, such as thirty seconds, one minute, two minutes, five minutes, ten minutes, or thirty minutes. In such embodiments, the payment selection system may complete the transaction using the user payment account initially included in the transaction request. In some embodiments, the user may pre-select such settings and preferences when enrolling with the payment selection system.

Figure 7:
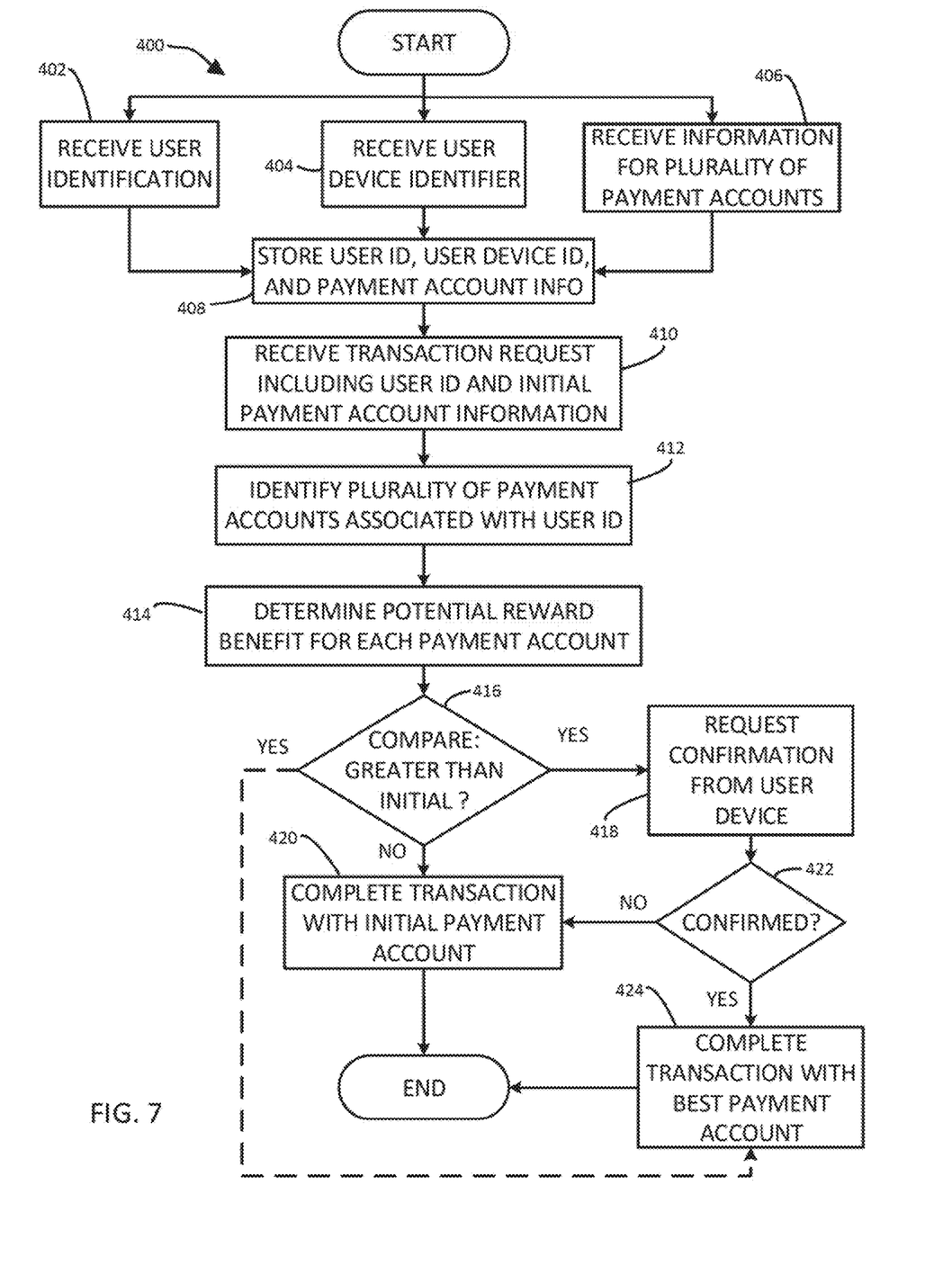
FIG. 7 is a flow chart of another embodiment of a process for selecting payments using the payment selection system described herein.

FIG. 7 shows a flow chart of another embodiment 400 of a method of using the payment selection system or server. During user enrollment, the payment selection system may receive user identification information at 402, a user device identifier at 404, and information payment account information associated with a plurality of user payment accounts at 406. The user device identifier may be associated with a user computing device at which the user would like to receive confirmation requests from the payment selection system. At 408, the payment selection system may store the user identifying information, user device identifier, and payment account information either at the payment server 85, a token server 80, or other suitable location.

At block 410, the payment selection system may receive a transaction request that may include user identifying information and initial payment account information. In some embodiments, the initial payment account information may be for a payment account with which the user initiated the requested transaction. At 412, the payment selection system may, based on the user identifying information, identify the plurality of payment accounts associated with the user identifying information. At 414, the payment selection system may determine any potential reward benefits for each of the plurality of payment accounts.

At 416, the payment selection system may compare the potential reward benefits to determine which of the plurality of user payment accounts would provide the greatest benefit to the user. If completing the requested transaction with the initial payment account would provide the greatest benefit, the payment selection system may, at 420, complete the requested transaction with the initial payment account. If any other of the plurality of user payment accounts provides a greater potential rewards benefit to the user than the initial payment account, the payment selection system may determine the best user payment account for the requested transaction based on the user payment account that would provide the greatest potential benefit.

At 418, the payment selection system or server may transmit a confirmation request to the user computing device associated with the user device identifier received at 404 requesting confirmation to complete the requested transaction using the best user payment account instead of the initial user payment account. If, at 422, the payment selection system receives a confirmation from the user computing device to use the best user payment account within a predetermined amount of time, the payment selection system may, at 424, complete the requested transaction using the best user payment account. If, at 422, the payment selection system receives a denial of the confirmation request or does not receive a confirmation from the user computing device within a predetermined amount of time, the payment selection system, at 420 may complete the requested transaction with the initial user payment account.

In some embodiments, the payment selection system may, as selectable by the user, automatically complete the requested transaction with the best user payment account if no confirmation is received from the user computing device within a predetermined amount of time. In some embodiments, as represented by the dashed line between blocks 416 and 424, the payment selection system may automatically complete the requested transaction using the best user payment account without requesting confirmation from the user or the user computing device.

Figure 8:
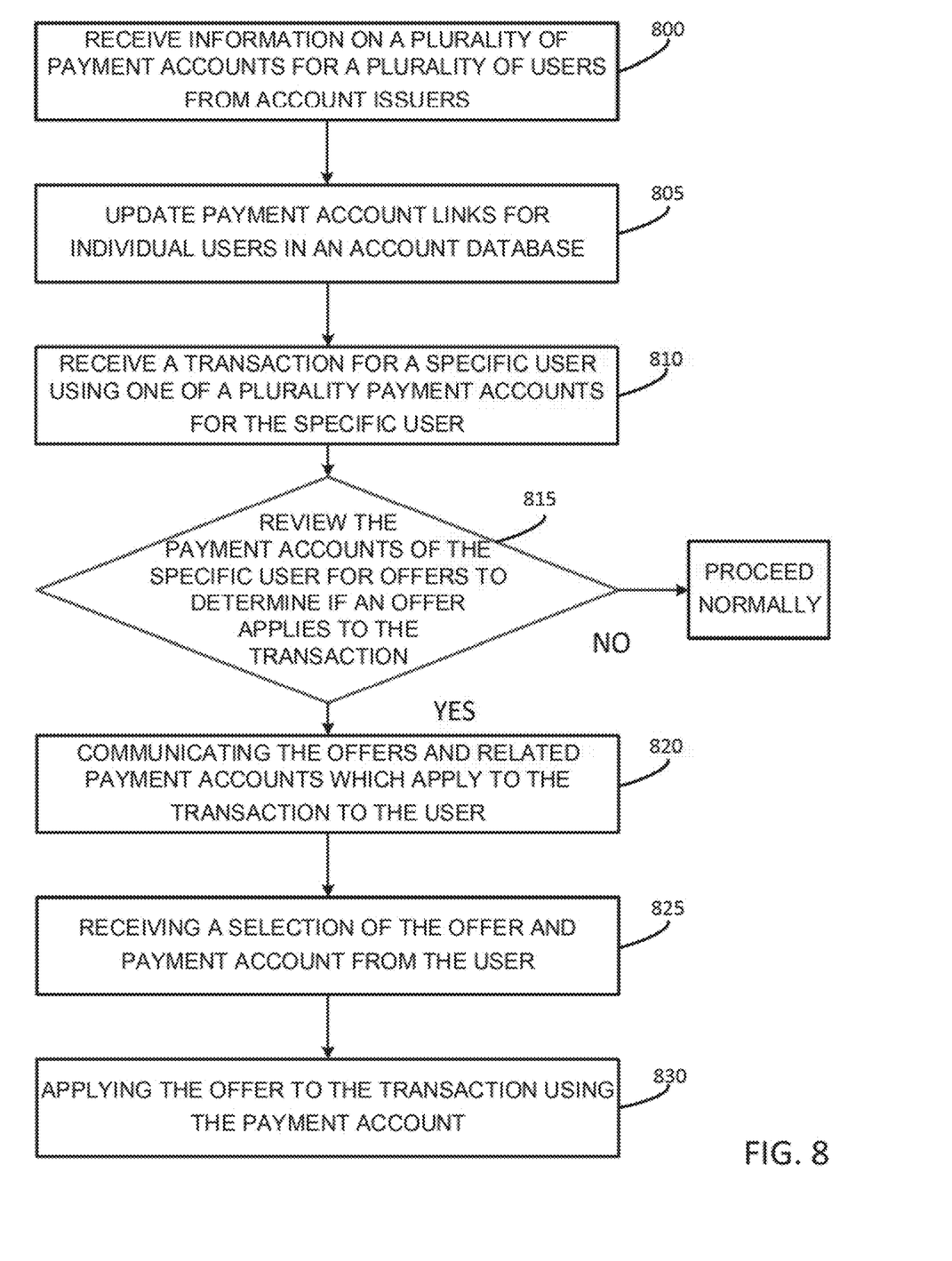
FIG. 8 is a flow chart of another embodiment of a process for selecting payments using the payment selection system described herein.

Referring to FIG. 8, a method of determining a payment account to use for a specific transaction of a plurality of payment accounts may be disclosed. As mentioned previously, consumers often have offers available them that they do not know about. When making a purchase, the focus is often on the purchase and not on whether any deals or offers may be available. The situation becomes further complex when a user has several payment accounts available and each payment account may have different offers available. Finally, the payment accounts may be from different issuers which may further complicate the ability of a user to efficiently determine which offers are available on a specific purchase.

The described system and method may collect account information from a variety of payment accounts. The payment information may include the offers that are available on each of the plurality of payment accounts that are available to a user. In some embodiments, the payment accounts may be from separate issuers. The offers may be communicated to a user or a use may set preferences for a ranking scheme to be used and the best offer may be automatically applied by selecting to use the payment device related to the best offer.

Referring again to FIG. 8, at block 800 information on a plurality of payment accounts for a plurality of users from account issuers may be received from an account holder management file server. The payment account may be a credit account, a debit account, a bank account, a savings account, or an investment account. In additional embodiments, the payment accounts may be stores of value such as airline miles, electronic credits, Bitcoin, Etherium or other forms of value. The account holder management file server may be used by an account issuer to keep track of accounts that authorized to be used by consumers.

Offers may take on a variety of forms. At a high level, the offers may be used to entice a user to buy a product or service, use a specific merchant or a specific location or specific payment method. Some offers may be immediate discounts. Other offers may be discounts on future products.

Some offers may be for electronic points or miles. Other offers may be for future discounts or discounts on related products.

As mentioned previously, different payment devices may have different offers and some offers may be more exciting to some users than other offers. For example, a first payment device may have first offers and a second payment device may have second offers where the first offer and second offer may be different offers. Some users may prefer to earn discounts off listed prices. Some users may prefer cash back while other users my prefer airline miles. The desirability of the offers may vary according to the user.

Account information may include a variety of information related to a transaction. In some embodiments, it may include an account number and may also include an expiration date, a CCV number, a zip code or other information associated with the account. It also may include a merchant identifier and an identifier of the good or service purchased.

The data related to the transaction may depend on the transaction and the protocol being used to enable the sale. Some transaction protocols may have a minimal amount of information such as a merchant identifier and a sale amount. Other transaction protocols may be richer and contain additional detail such as an identifier for the good or service purchase, the cost of each good or service purchased, the number of each good or service purchased, a sku number of the good or service purchased, etc.

In some embodiments, an electronic wallet may be part of the system. In an electronic wallet, details such as the Personal Account Number (PAN) for one or more purchase devices are stored securely. In an app, a user may select to use a purchase device stored in the electronic wallet. The electronic wallet may communicate a token which may have a one-time use PAN to complete the transaction where the one time use PAN is not the actual PAN. The token may be relayed by the merchant to a token server which may determine in the token is valid and may execute the transaction to be posted to the proper payment device selected by the user in the app. The system may have to communicate with the token server to be able to match offers with the various accounts in the token server for the user.

At block 805, at an account issuer, payment account links may be updated for individual users in an account database. Payment account links may be communicated to account issuers on a periodic basis, such as on a daily basis. The account links may be stored in an account management file. The account management file may link accounts to individuals or groups when more than one person has signing power on the payment account. The account database may be useful to battle fraud and may be useful to match payments accounts and related offers to users.

As noted briefly, payment accounts may have more than one user. The additional users may be related user such as a first spouse and a second spouse in the relationship may have access to or be authorized user on the payment account. Similarly, a parent may add a relative to an account, like a child. These connected users may be thought of as groups. Further, these connected users may also have separate accounts and these separate accounts may have different offers. By grouping the connected individuals together as a group, the offers available to one or more individuals of the group may be reviewed and possibly applied.

At block 810, the system may receive a transaction for a specific user using one of a plurality payment accounts for the specific user. The transaction may be for a god or service. As mentioned previously, different transaction protocols may be used and the level of detail may vary. In some instances, the good or service may not be available. In other instances, significant detail about the good or service purchased may be available.

At block 815, the payment accounts of the specific user may be reviewed for offers related to the payment accounts to determine if an offer applies to the transaction using at least one of the payment accounts. As mentioned previously, the offers may be on a variety of levels. In some embodiments, the offers may be merchant specific. In the cases where the transaction detail is minimal, even offers which are merchant specific may be located. In cases where more detail is available, offers for a product or for a manufacturer or a service provider may be reviewed. The level of detail in the review may be related to the detail in the transaction data.

The offers may be stored according to a protocol and may be in a high database available for prompt searching. The protocol may enable the offers to be quickly matched. In addition, artificial intelligence may be used to assist in matching the offers to the goods or services. For example, every store may have different SKU numbers for the same product. By using artificial intelligence, the system may learn over time that a SKU at Store 1 may be for the same product with a different SKU at Store 2 and that an offer may exist for the product. In addition, spelling of goods and services may vary over merchants especially with abbreviations and summaries that occur in the transaction network.

In some embodiments, an application programing interface (API) may be used to assist in the review. For example, the merchant name or product name or SKU code or service description may be communicated to an API and the API may return whether offers are available or what are the offers that are available. In this way, the search may be faster as the response may be in a known format.

At block 820, if one or more offers applies to the transaction using at least one of the payment accounts, the offers and related payment accounts which apply to the transaction of the user may be communicated to the user. The communication make take on a variety of forms. For example and not a limitation, the message may be a text message, an email, a telephone call, or a notification in an application.

In addition, a ranked order of the offers may be determined. The ranking may be determined in a variety of ways. In some embodiments, the ranking may be simply based on the dollar value of the offer or the reward as described in FIGS. 5 and 6. In other embodiments, the ranking may be based on the expiration date of the offer or loyalty reward. In other embodiments, a user may use an interface and may set parameters that may be used to evaluate the offers or rewards.

Figure 9:
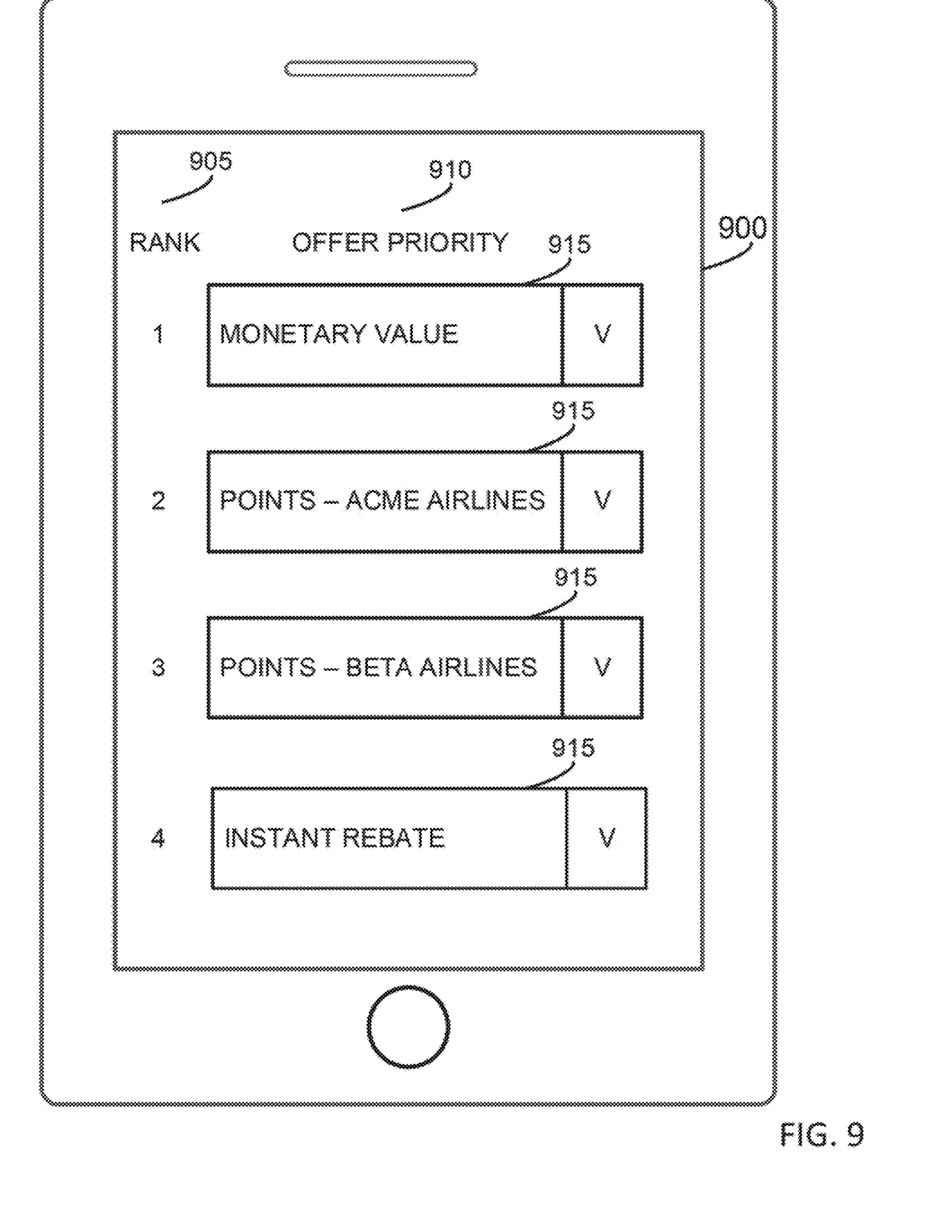
FIG. 9 is a user interface diagram illustrating example features of an embodiment of a user interface for the payment selection system as described herein.

FIG. 9 may be a sample user interface 900 where parameters are set by the user to determine which offer is the most desirable to the user. In one embodiment, the user may be able to select from drop down menus to rank preferences 905 for a variety of aspects of offer preferences 910. For example, loyalty points may be available for some transactions and a user may highly value loyalty points. In addition, a user may have airline loyalty points and hotel loyalty points and the user may prefer hotel loyalty points over airline loyalty points. Similarly, some user may prefer immediate cash discounts over rebates. The drop down boxes 915 may allow a user to help determine how the ranking should appear for that user.

In other embodiments, artificial intelligence may be used to learn from users past selections to make future determinations of rankings better reflect the desires of a user. For example, if a user consistently selects to receive airline loyalty points, the system may learn that airline loyalty points should be ranker higher than hotel loyalty points. Similarly, some user may prefer immediate cash discounts over rebates. By studying past transactions for the individual, predictions for the ranking of offers may improve. In addition, groups of users that are similar may also be reviewed to increase the amount of data to be studied to further refine the artificial intelligence model.

In the embodiments where a user has set preferences or artificial intelligence has been used to learn preferences, the system may automatically apply the highest ranking offer. In some embodiments, a user may select whether the system may automatically select the best offer. In other embodiments, a user may be asked to confirm the use of the best offer.

At block 825, a selection of the offer and payment account from the user may be received from the user. As mentioned previously, the selection may be made by the user in a variety of ways such as receiving a text message and responding with a selection, using an app to express the preference or allowing a preset preference to make the selection.

At block 830, the offer may be applied to the transaction using the payment account. The application of the offer may follow the path and process for the various offer. For example, some offers may appear as credits on a monthly statement. Other offers may be rebates and checks, debit cards or other forms of credit may be communicated. Loyalty points may be added to the appropriate loyalty account in the appropriate period of time.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, system 10 and the methods described herein may be configured to provide real-time incentive information to service providers and execute near-immediate payout splits upon service completion. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method of determining a payment account to use for a specific transaction of a plurality of payment accounts comprising:

receiving from an account holder management file server information on a plurality of payment accounts for a plurality of users from account issuers;

at the account issuer, updating payment account links for individual users in an account database;

at an account selection server, receiving a transaction for a specific user using one of a plurality payment accounts for the specific user when the transaction is initiated on a payment network;

reviewing the payment accounts of the specific user for offers associated with the payment accounts to determine if one or more offers associated with the payment accounts apply to the transaction;

if one or more offers associated with the payment accounts apply to the transaction, determining an offer with a highest rank from the one or more offers;

communicating a confirmation request having the highest ranked offer to a user device of the user in real time with respect to the transaction, the confirmation request allowing the user to select the payment account having the highest ranked offer for completing the transaction; and completing the transaction with the payment account having the highest ranked offer in response to the user selecting the payment account via the confirmation request.

2. The method of claim 1, wherein the payment account is one of a credit account, a debit account, a bank account, a savings account, and an investment account.

3. The method of claim 1, wherein the offers comprise first offers and second offers.

4. The method of claim 3, wherein a first payment account has the first offers and a second payment account has the second offers and the first offers are different than the second offers.

5. The method of claim 1, wherein data related to the transaction comprises an account number, a merchant identifier and an identifier of a good or service purchased.

6. The method of claim 1, wherein the payment account information is stored in an electronic wallet.

7. The method of claim 1, wherein the specific user has related users.

8. The method of claim 7, wherein the related users are authorized users of the payment account.

9. The method of claim 4, further comprising determining a ranked order of the offers and displaying the offers in the ranked order.

10. The method of claim 9, wherein the ranked order is based on a monetary value of the offers.

11. The method of claim 9, wherein the ranked order is based on an expiration date of the offers.

12. The method of claim 10, wherein the communicating the offers comprises at least one of a text message, an email, a telephone call, and a notification in an application.

13. The method of claim 1, wherein the transaction is communicated according to a protocol and a response is received according to a protocol.

14. The method of claim 13, wherein the transaction is used to access an API and the API responds with offers in an expected format.

15. The method of claim 1, further comprising creating a user interface to display options to the user to sign up for the method.

16. The method of claim 15, wherein the user selects a ranking scheme to be used to rank the offers and determine the highest ranked offer.

17. The method of claim 16, wherein a payment account of the user used to initiate the transaction is used to complete the transaction if the user declines or fails to respond to the confirmation request.

18. The method of claim 1, wherein the offers are stored according to a protocol.

19. A computer system for determining a payment account to use for a specific transaction of a plurality of payment accounts comprising:

an account holder management file server that is physically configured to communicate information on a plurality of payment accounts for a plurality of users from account issuers to an account selection server;

the account selection server which is physically configured for:

updating payment account links for individual users in an account database;

receiving a transaction for a specific user using one of a plurality payment accounts for the specific user when the transaction is initiated on a payment network;

reviewing the payment accounts of the specific user for offers associated with the payment accounts to determine if one or more offers associated with the payment accounts apply to the transaction using at least one of the payment accounts;

if one or more offers associated with the payment accounts apply to the transaction, determining an offer with a highest rank from the one or more offers;

communicating a confirmation request having the highest ranked offer to a user device of the user in real time with respect to the transaction, the confirmation request allowing the user to select the payment account having the highest ranked offer for completing the transaction; and completing the transaction with the payment account having the highest ranked offer in response to the user selecting the payment account via the confirmation request.

20. The computer system of claim 19, wherein the payment account is one of a credit account, a debit account, a bank account, a savings account, and an investment account.

* * * * *